United States Patent
McSherry

(10) Patent No.: US 7,596,556 B2
(45) Date of Patent: Sep. 29, 2009

(54) DETERMINATION OF USEFUL CONVERGENCE OF STATIC RANK

(75) Inventor: Frank D. McSherry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 11/227,301

(22) Filed: Sep. 15, 2005

(65) Prior Publication Data

US 2007/0061315 A1    Mar. 15, 2007

(51) Int. Cl.
G06F 17/30 (2006.01)
(52) U.S. Cl. .............................................. 707/4; 707/3
(58) Field of Classification Search ................. None
See application file for complete search history.

(56) References Cited

U.S. PATENT DOCUMENTS

| | | | |
|---|---|---|---|
| 6,321,228 B1* | 11/2001 | Crandall et al. ............... 707/10 |
| 6,799,176 B1* | 9/2004 | Page .............................. 707/5 |
| 6,842,761 B2* | 1/2005 | Diamond et al. ......... 707/104.1 |
| 7,231,399 B1* | 6/2007 | Bern et al. ................... 707/102 |
| 7,249,058 B2* | 7/2007 | Kim et al. ...................... 705/26 |
| 2003/0061214 A1 | 3/2003 | Alpha ............................. 707/7 |
| 2003/0208482 A1* | 11/2003 | Kim et al. ....................... 707/3 |
| 2004/0139068 A1 | 7/2004 | Lau et al. ....................... 707/3 |
| 2004/0267717 A1 | 12/2004 | Slackman ....................... 707/3 |
| 2005/0149502 A1* | 7/2005 | McSherry ...................... 707/3 |
| 2006/0074905 A1* | 4/2006 | Yun et al. ....................... 707/5 |

OTHER PUBLICATIONS

Brin, Sergey, et al., "The Anatomy of a Large-Scale Hypertextual Web Search Engine," *Computer Networks and ISDN Systems*, 30 (1-7), Elsevier Science Publishers B.V., 1998, pp. 107-117.
McSherry, Frank, "A Uniform Approach to Accelerated PageRank Computation," International World Wide Web Conference, Proceedings of the 14th International Conference on World Wide Web, 2005, ACM Press, pp. 575-582.

* cited by examiner

*Primary Examiner*—Pierre M Vital
*Assistant Examiner*—Loan T Nguyen
(74) *Attorney, Agent, or Firm*—Woodcock Washburn LLP

(57) ABSTRACT

An input or query is determined for which a search engine's static ranking computation is the answer. By understanding how this input or query differs from the posed input or query, the precise termination point of an iterative convergence problem can be determined. An iterative process provides the following inputs to the system: a graph of hyperlinks, and a vector of how the probability mass is redistributed. Given the set of ranks (the output results), it is determined how the input (e.g., the query) would have to be changed to get the rank(s) as the answer or result. Backward answer analysis is provided in the web page context. The difference between what was asked and what should have been asked is determined. After the difference is computed, it is determined if the iterative process should be stopped or not.

17 Claims, 3 Drawing Sheets

DETERMINATION OF USEFUL CONVERGENCE OF STATIC RANK

BACKGROUND

The Internet presently comprises billions of web pages interconnected via hyperlinks. Users of the Internet typically use web browsing applications ("browsers") to navigate among these pages by either selecting and clicking hyperlinks, or by manually entering a "Uniform Resource Locator" ("URL") which allows the browser to access a particular web page directly. Often times, however, a user wishes to search the Internet for pages containing particular items of information. Because of the size of the Internet, it is impractical for a user to manually browse the Internet searching for relevant pages. Instead, users typically invoke search engines, which are computer applications developed for the purpose of searching the Internet. Search engines typically reside on server computing devices and accept queries from client users. A search engine is usually associated with an index of web pages, and, in response to a user query, returns a list of pages satisfying the query.

Some modern search engines rank web pages in order to provide users with more relevant results. Rank is an indication of a web page's quality responsive to the query. Many search engines represent the interconnection of web pages via a matrix, and finding a page ranking equates to finding the principal eigenvector of the matrix. In a conventional search engine, an iteration takes a ranking of the web pages and propagates it across the interconnection matrix, to obtain an updated ranking for the pages. Eventually, the rankings for all pages converge to fixed values, which are the entries of the principal eigenvector. This is equivalent to calculating the stationary distribution of a Markov chain. Due to the size of the matrices, computing the eigenvector—and thus the page ranks—is a computationally intensive task in existing systems, requiring several iterations of matrix manipulation before values for all pages converge to the eigenvector.

Conventionally, a search engine's static ranking computations involve the computation of the stationary distribution of a rather large random walk on the web graph, coupled with an occasional random reset. This computation is iterative, and the solution at any step is only an approximation to the true solution. Typically, the process is stopped when the solution changes little from step to step, reflecting near convergence.

This process is ad hoc, in that the decision as to how much change is acceptable is rather arbitrary, and the implications of inaccuracy are not well understood. Large error could be concentrated in small pockets, being highly detrimental to the ranks of those pages, or spread evenly over pages causing little harm. This uncertainty requires pessimism in measurement, potentially requiring far more executions than are actually needed for quality results.

SUMMARY

Aspects of the invention determine the problem, input, or query for which a search engine's static ranking computation is the answer. By understanding how this problem, input, or query differs from the posed problem, input, or query, a precise termination point of an iterative convergence problem can be determined. A mathematical transformation may be used to view the problem of convergence, and several methods, techniques, or processes may be used for determining satisfactory convergence.

An iterative process provides the following inputs to the system: a graph of hyperlinks, and a vector of how the probability mass is redistributed. Given the set of ranks (the output results), it is determined how the input (e.g., the input parameters) would have to be changed to get the rank(s) as the answer or result. Backward answer analysis is provided in the web page context. The difference between what was asked and what should have been asked is determined. After the difference is computed, it is determined if the iterative process should be stopped or not.

DETAILED DESCRIPTION

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment. The skilled artisan will readily appreciate that the methods and systems described herein are merely exemplary and that variations can be made without departing from the spirit and scope of the invention.

Figure 1:
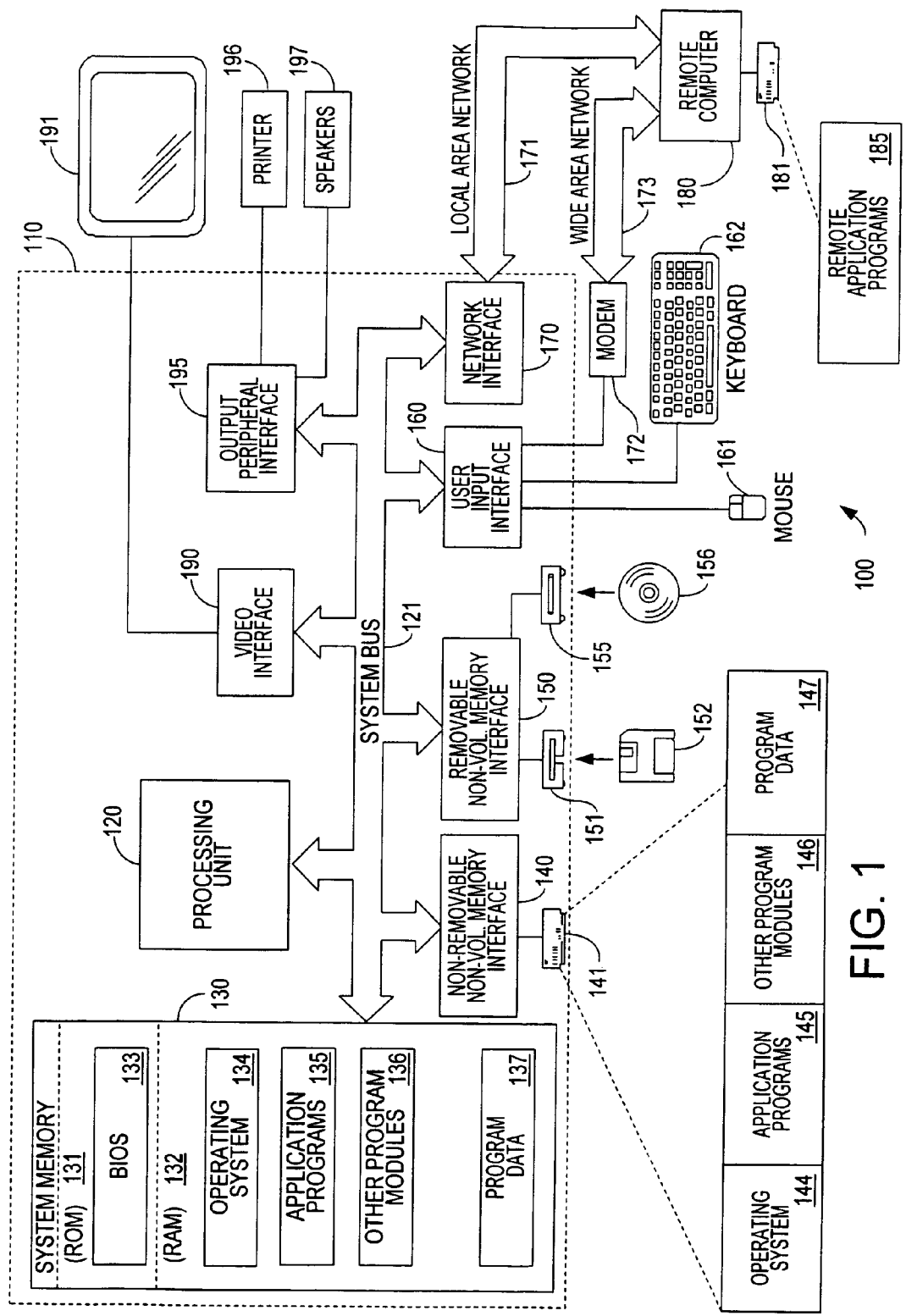
FIG. 1 is a simplified schematic illustrating an exemplary architecture of a computing device in which aspects of the invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet or electronic digitizer, a microphone, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 195 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
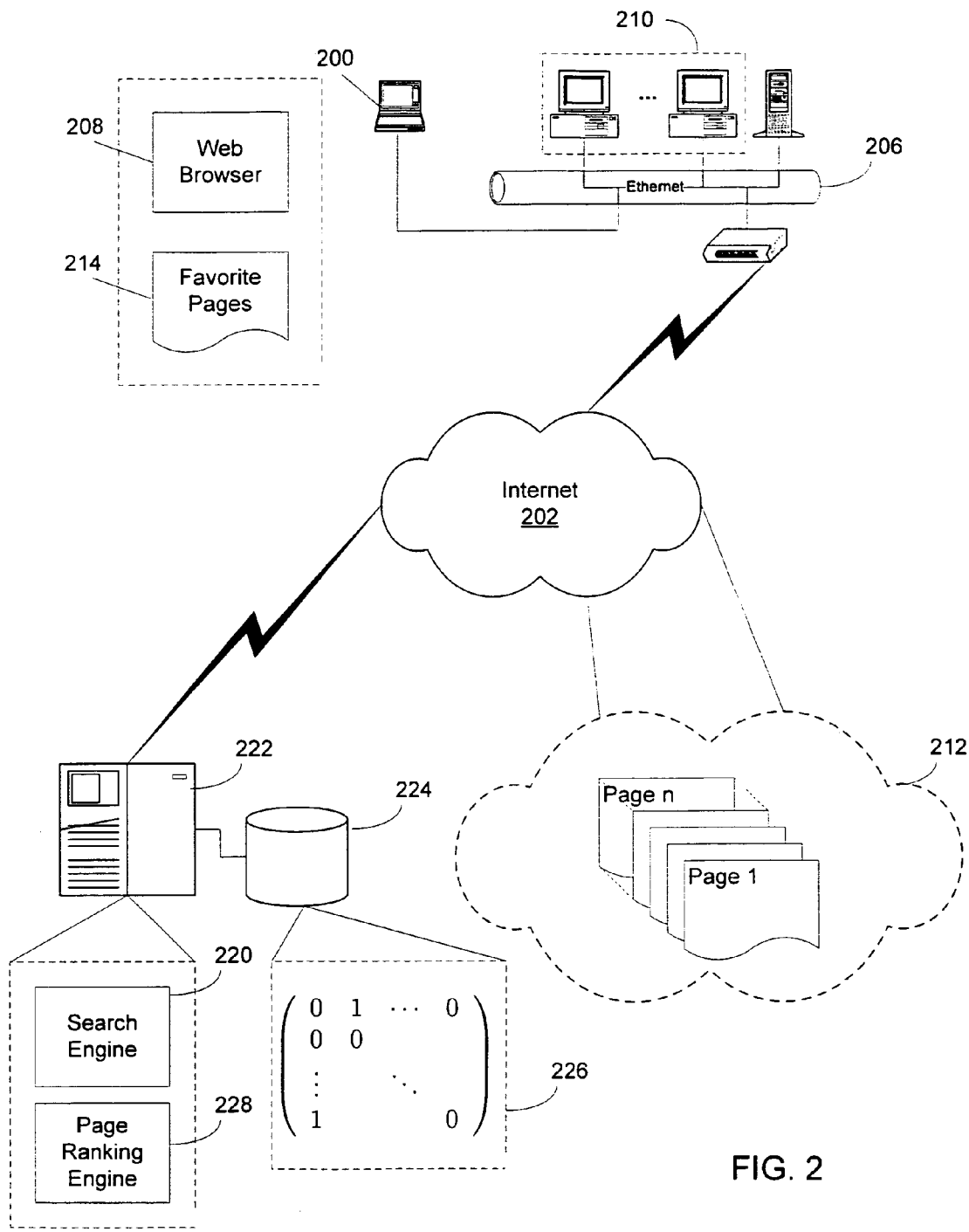
FIG. 2 is a diagram illustrating an arrangement of computing devices connected to the Internet for carrying out aspects of the invention.

Turning to FIG. 2, an example of a computing environment is depicted wherein aspects of the invention may be potentially exploited. In the illustrative environment, a computer 200 includes a network interface card (not specifically shown) facilitating communications over a communications medium. In the particular example depicted in FIG. 2, the computer 200 communicates with a local area network 206 via physical connection. Alternatively, the computer 200 could communicate with the local area network 206 via WWAN or WLAN media, or via other communications media.

The user of the computer 200, as a result of the supported network medium, is able to access the Internet 202. For example, the computer 200 accesses resources on the LAN 206 directly via physical connection to the LAN 206. The LAN 206 in the illustrative example is assumed to include network access and proxy servers that enable a properly authenticated user of the computer 200 to access resources of the Internet 202.

The Internet 202 is presented to the user of the computer 200 in the form of web pages. A web page contains content and instructions to be processed and displayed by a web browser application 208 residing on the computer 200. Alternatively, the web browser application 208 resides on a networked computer 210, and is graphically displayed on the computer 200 via a remote display program. Web pages also contain hyperlinks to other web pages, allowing a user to easily navigate from a displayed page to related pages by selecting a presented hyperlink. In this way, the hyperlinks on pages create a "web" of interconnected pages, whereby a user can navigate from one page to any of millions or billions of pages by a series of hyperlink selections. Although there may be several billion interconnected web pages accessible over the Internet 202, it is useful for purposes of the present invention to consider the pages as an ordered set of pages 212 numbered 1 to n, where n is the total number of pages accessible on the interconnected network of web pages. To aid users in keeping track of interesting web pages, web browser applications, can contain a "Favorites" or "Bookmarks" feature 214, whereby the user is able to store a list of web pages he is likely to access frequently, enabling easy navigation to those pages in the future.

Although a user is able to navigate to web pages merely by selecting hyperlinks, tools such as search engines exist to aid the user in finding particular information contained in web pages. In a typical scenario, the search engine 220 is housed in a server 222 connected to the Internet 202, and is also connected to a database 224 containing indices and information 226 about web pages on the Internet. In a typical search engine, the user is presented with a web page on which he enters search parameters, usually in the form of search terms. The search engine 220 uses its database 224 to process the user request and in turn present the user with a new web page containing links to other pages that satisfied the parameters of the user's request.

When a large number of pages satisfy the search parameters, presenting the search results to the user in an organized manner may be problematic. A list of thousands of web pages in no particular order forces the user to painstakingly manually sort through the entire list to find relevant pages. Therefore, modern search engines often grade or "rank" pages based on presumed relevance to the user by using, for example, an incorporated page ranking engine 228. The web pages satisfying the search can then be sorted by presumed relevance, so that the user is presented with the most relevant results at the top of the result list.

Several existing methods for ranking web pages utilize the notion of a theoretical "random walk" among the web pages of the Internet. Generally, a random walk can be thought of as starting at some web page k and then selecting a hyperlink to page j with some probability $A[j,k]$. The walk continues from page j by selecting a hyperlink to another page i, with some probability $A[i, j]$. The theoretical random walk continues indefinitely. By performing mathematical manipulations on the random walk transition matrix A, a search engine can rank a page based on the probability of arriving at the page at a step of the random walk.

Most web search architectures comprise a static ranking system, providing independent scores for each page. As noted above, a search engine's static ranking computations involve the iterative computation of the stationary distribution of a large random walk on the web graph, coupled with an occasional random reset to a pre-specified distribution. This random walk emulates the movement of an imaginary surfer, and the likelihood that the surfer is viewing a particular page at any given time is used as the score. Because the computation is iterative, the solution at any step is only an approximation to the true solution. Typically, the process is stopped when the solution changes little from step to step, reflecting near convergence. However, this conventional process is undesirable, as the acceptable change may be arbitrary, and inaccuracies, uncertainty, and errors may remain.

Aspects of the invention determine the problem, input, or query for which the current estimate is the answer. By understanding how this problem, input, or query differs from the posed problem, input, or query, the precise termination point can be determined. A mathematical transformation may be used to view the problem of convergence, and several methods, techniques, or processes may be used for determining satisfactory convergence. A general framework is also described from which other methods, techniques, or processes may be derived.

An iterative process provides the following inputs to the system: a graph of hyperlinks, and a vector of how the probability mass is redistributed. Given the set of ranks (the output results), it is determined how the input (e.g., the input parameters) would have to be changed to get the rank(s) as the answer or result. Backward answer analysis is provided in the web page context. The difference between what was asked or provided (the vector d representing the input) and what should have been asked or provided (the vector e representing the input that should have been asked or provided to more precisely get the resulting rank) is determined. After the difference is computed, it is determined if the iterative process (described further herein) should be stopped or not.

Figure 3:
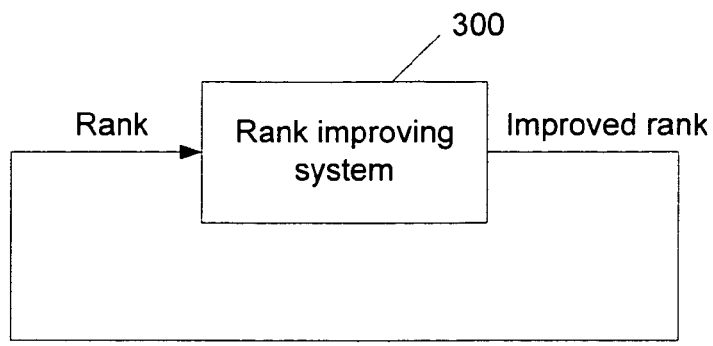
FIG. 3 is a feedback diagram.

As shown in the feedback diagram of FIG. 3, rank is input to a system 300 (e.g., comprising a page ranking engine) that improves the rank, using example techniques set forth herein, for example. The output rank is improved over the input rank, and this output rank is then provided back into the system 300. Because any solution desirably converges to the same limit, the system may be started with a rank vector that assigns uniform scores to every page. Alternatively, the computation may be started from a previously known vector of ranks that is thought to be desirable, perhaps the results of a preceding computation.

This loop is cycled through repeatedly until a predetermined condition is met. For example, a condition may be the difference between the rank input to the system 300 and the output improved rank is less than a predetermined amount, or determine if e and d satisfy a user specified convergence test. The test may be more complicated than considering the distance between the two, and desirably is something that the user has control over. As described further herein, inputs are desirably the set of ranks, the d vector (representing the input), and the A matrix which describes the web structure of the graph (e.g., how rank or authority flows from one page to another page).

Figure 4:
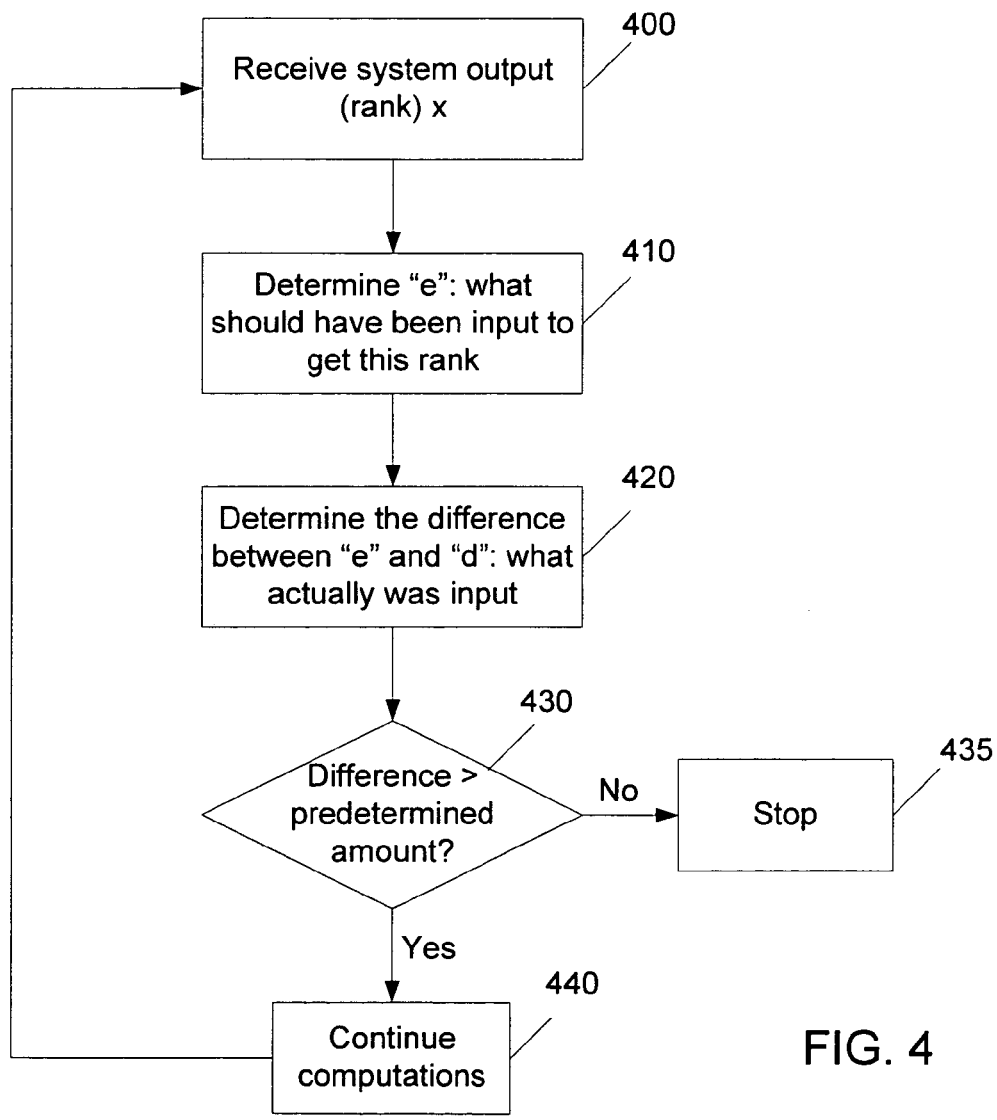
FIG. 4 is a flow diagram of an exemplary ranking convergence process.

FIG. 4 is a flow diagram of an exemplary ranking convergence process. At step 400, the output of a system, the rank x representing a result for example, is received. It is determined at step 410 what should have been the input e to get this answer. The difference between e and the actual input d is determined, at step 420. Other tests may be used, such as determining if e and d satisfy a user specified convergence test.

The vector e, denoting the reset distribution that has the current rank vector x as its solution, is desirably determined by $e=d-(Ax+dr^Tx-x)/r^Tx$ (similar to that described below with respect to equation (3)). Ax may be computed as part of the next iteration, and in so doing one can also compute and observe the vector e. Notice that e is not a matter of choice on the part of the algorithm executor. It is determined by d, r, A, and the current rank vector x. Once these terms are specified, e is a consequence.

If the difference is greater than a predetermined amount (or if a difference vector is deemed to be significant, or the test condition being used is not satisfied), at step 430, then the processing continues at step 440 with the loop cycling back to continue to improve the output ranking. If the difference is smaller than the predetermined amount, then the looping discontinues, at step 435. More particularly, if the difference vector is deemed insignificant with respect to the intended reset vector, using one of several possible tests, then the looping discontinues. The nature of "insignificant" is then captured by the predicate, which a user may specify to best suit their needs. The predetermined amount might be determined based on a variety of tests, such as the example test conditions described below. An example may be test (e,d): if each coordinate of e is within ±1% of the corresponding coordinate in d, then terminate.

Thus, given a distribution x (ranks), the reset distribution d for which x is the stationary distribution may be determined. Over time, the value of d associated with the more and more accurate value of x will converge towards the specified reset distribution. However, as processing proceeds, the difference between d and the intended distribution is analyzed, and processing terminates once the distribution d is acceptable, e.g., either because its values are each sufficiently close to the intended values, or because the reset distribution is specified implicitly, rather than explicitly.

More particularly, for notation, let the matrix A contain the probabilities that a random surfer transits from one page to another. A[i,j] will be the probability that the surfer ends at page i, given that he started at page j. The probabilities from a given page j desirably are positive and add up to at most one. They need not add up to one, however, as a non-zero probability exists that the surfer "resets" from each page j, and this probability denoted r[j]. When the surfer resets, the page is chosen from a specified distribution d. Put another way, d is the input that is provided, and e is the input that should have been provided. Using this notation, the distribution over states after one step, assuming the surfer is initially distributed according to a distribution x, is given by equation (1):

$$\text{new\_}x=(A+dr^T)x \qquad (1)$$

where $P=A+dr^T$ captures both random movement according to web links transit, as well as random resetting transit. r is a fraction of each page's rank that survives propagation. Desirably, only a fraction of each page's score is propagated across their incident link. Thus, a fraction of the rank is "harvested" for redistribution according to the reset distribution d, determined by the page's value in the vector r.

It is desirable to determine a vector x* which satisfies new_x=x, meaning that the process of surfing has converged to a fixed point. By classical theorems, such a fixed point exists, and can be determined by performing many steps, e.g., re-inserting new_x into equation (1), and computing the distribution resulting from progressively more consecutive steps.

This process is iterative, and at any point in time the approximate value of x will not satisfy equation (2):

$$x=(A+dr^T)x \qquad (2)$$

as desired. However, it will be close, in that $(A+dr^T)x-x$ will be a vector of small magnitude. When this difference becomes very small, it is assumed that the system has effectively converged, and it is time to stop.

Viewed differently, take the vector x at any point in time and produce a different reset distribution as given by equation (3):

$$e=d-((A+dr^T)x-x)/r^Tx \qquad (3)$$

satisfying the equality given by equation (4):

$$x=(A+er^T)x \qquad (4)$$

which can be verified by substituting the definition of e and canceling terms. Notice that when $(A+dr^T)x$ is very nearly x, the vector e is very nearly d, and so in the limit the effective reset distribution approaches d.

This transformation allows the convergence problem to be viewed differently. Rather than asking for a vector that nearly satisfies the conditions, instead ask for a vector that satisfies conditions near to those specified. In other words, examine the difference d–e and insist on properties of it (typically that it be "small", as specified by a user). The former (approximate satisfaction) carries little in the way of guarantees, while the latter (satisfaction of an approximation) makes very clear the meaning of the vector x: it is the precise stationary distribution of a slightly different chain. The difference can be analyzed, and reasonable conditions may be established under which this answer may be satisfactory.

Example test conditions include, but are not limited to:
1. Testing when $\|d-e\|$ is large or small, effectively requiring a reset distribution close to d.
2. Testing that each coordinate of d–e is small, requiring a reset distribution that locally matches d.
3. Applying one of several domain specific tests, e.g., suggesting that distributions are preferred that do not put a lot of probability mass on a single host.

4. Specifying the original vector d in terms of intervals for each coordinate, so that satisfaction would be achieved with any reset vector whose coordinates lie in such an interval (for example, 1% accuracy around a particular value for each coordinate).

5. Arbitrarily general predicates of d, e.

Additionally, the vector d–e provides rich information about the error in the current vector x. It indicates which pages have ranks higher than they should and which are lower. When combined with convergence criteria, this information may inform adaptive iterative techniques which are responsive to such input.

The A matrix and the d and r vectors may be generated or determined using conventional techniques, processes, or methods. The e vector is computed. After e is computed, a mechanism is used to determine if d and e are similar enough. There are many ways (functions) to compare d and e, such as the examples set forth above. Based on results of the comparison, it is determined whether the cycling should be continued or not.

Alternatively, for example, rather than compute a matrix-vector product of the form $(A+dr^T)x$, which uses a dense matrix $A+dr^T$ that may not be affordable or desirable to construct, the multiplication may be distributed as $x=Ax+dr^Tx=Ax+d(r,x)$. In this manner, the (dense) matrix $A+dr^T$ is not formed, and the correct answer is still obtained.

In conclusion, termination conditions in current iterative systems are ad hoc, and produce outputs that have an unclear relation to the input. Being "off" by a certain error is not desirable. Instead, by viewing the problem differently, concrete statements may be made about the properties of the output, and these properties may be used as the basis of a convergence test that is more informed than traditional convergence tests. The informed tests can lead to more advanced methods of directing the iterative process, focusing effort on the parts of d–e that are "most erroneous".

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention may be described in terms of software modules or components, those skilled in the art will recognize that such may be equivalently replaced by hardware components. Therefore, the invention as described herein contemplates all such embodiments as may come within the scope of the following claims and equivalents thereof.

What is claimed:

1. A method implemented on at least one computing system of determining convergence of a rank, the at least one computing system including at least one processor, the method comprising:

receiving the rank, the received rank being an output of a first computation;

determining an estimated input of a second computation based on the received rank, the received rank being a converged solution of the second computation resulting from the estimated input;

comparing the estimated input of the second computation to a predetermined input;

identifying a termination point of convergence based on the comparison, the point of convergence corresponding to a rank of an output of a web page search; and determining whether a convergence condition is met based on the estimated input and the predetermined input, wherein if the convergence condition is not met, receiving a subsequent rank, determining a subsequent estimated input of the second computation based on the subsequent rank, and determining whether the convergence condition is met based on the predetermined input and the subsequent estimated input.

2. The method of claim 1, wherein comparing the estimated input to the predetermined input comprises determining whether a difference between the estimated input and the predetermined input is smaller or larger than a predetermined amount.

3. The method of claim 1, further comprising determining whether a convergence condition is met based on the estimated input and the predetermined input.

4. The method of claim 1, further comprising: comparing the estimated input with a specification for a predetermined reset distribution; and iteratively identifying a termination point of convergence based on the comparison.

5. The method of claim 4, further comprising: receiving a second rank and, determining a second estimated input of the second computation responsive to the comparison of the estimated input and the specification; and comparing the second estimated input with the specification for the predetermined rest distribution.

6. A rank improvement system, comprising:

a processor that receives a rank, the received rank being an output of a first computation and determines an estimated input of a second computation based on the received rank, the received rank being a converged solution of the second computation resulting from the estimated input; and a comparator that compares the estimated input of the second computation to a predetermined input and generates a comparison result, the processor being configured to identify a point of convergence based on the comparison result, the processor determining whether a convergence condition is met based on the estimated input and the predetermined input, and wherein if the convergence condition is not met, the processor receives a subsequent rank, determines a subsequent estimated input of the second computation based on the subsequent rank, and determines whether the convergence condition is met based on the predetermined input and the subsequent estimated input.

7. The system of claim 6, wherein the convergence condition is user-changeable and the rank corresponds to the output results of a web page search.

8. A method implemented on at least one computing system of determining the convergence of a rank, the at least one computing system including at least one processor, the method comprising:

receiving a rank, the received rank being an output of a first computation; receiving a predetermined input;

determining an estimated input of a second computation, the received rank being a converged solution of the second computation resulting from the estimated input;

terminating the first computation upon a predetermined condition corresponding to a point of convergence, the point of convergence corresponding to a rank of an output of a web page search and the predetermined condition including one of:

an absolute value of the difference between the estimated input and the predetermined input being within a predetermined range; or a difference between the estimated input and the predetermined input being within a predetermined range; and determining whether a convergence condition is met based on the estimated input and the predetermined input, wherein if the convergence condition is not met, receiving a subsequent rank, determining a subsequent estimated input of the second computation based on the subsequent rank, and determining whether the convergence condition is met based on the predetermined input and the subsequent estimated input.

9. The method of claim 8, wherein the estimated input and the predetermined input are comprised of coordinates.

10. The method of claim 9, wherein the predetermined condition further includes:

a determination that each coordinate of the difference between the estimated input and the predetermined input is within a predetermined range.

11. The method of claim 9, wherein each of the coordinates of the predetermined input are specified with an interval.

12. The method of claim 11, wherein the predetermined condition further includes:

a determination that each coordinate of the estimated input is within a predetermined range of the interval of a corresponding coordinate of the predetermined input.

13. The method of claim 8, wherein the predetermined condition further includes: a determination that the estimated input being within a predetermined range of the predetermined input.

14. The method of claim 1, wherein the received rank is a converged solution of the second computation resulting from the estimated input.

15. The system of claim 6, wherein the received rank is a converged solution of the second computation resulting from the estimated input.

16. The method of claim 1, wherein the second computation outputs the received rank upon the estimated input being input to the second computation.

17. The system of claim 6, wherein the second computation outputs the received rank upon the estimated input being input to the second computation.

* * * * *